United States Patent
Held et al.

(10) Patent No.: US 11,980,966 B2
(45) Date of Patent: May 14, 2024

(54) METHOD, COMPUTER PROGRAM AND LASER CUTTING SYSTEM FOR SMART CORNER CUTTING

(71) Applicant: BYSTRONIC LASER AG, Niederoenz (CH)

(72) Inventors: Michael Held, Heimiswil (CH); Titus Peter Haas, Zofingen (CH); Daniel Borer, Niederbipp (CH); Elio Ingold, Niederönz (CH)

(73) Assignee: BYSTRONIC LASER AG, Niederoenz (CH)

( * ) Notice: Subject to any disclaimer, the term of this patent is extended or adjusted under 35 U.S.C. 154(b) by 0 days.

(21) Appl. No.: 18/248,742

(22) PCT Filed: Oct. 15, 2021

(86) PCT No.: PCT/EP2021/078616
§ 371 (c)(1),
(2) Date: Apr. 12, 2023

(87) PCT Pub. No.: WO2022/079240
PCT Pub. Date: Apr. 21, 2022

(65) Prior Publication Data
US 2023/0405710 A1   Dec. 21, 2023

(30) Foreign Application Priority Data
Oct. 16, 2020 (EP) .................................... 20202245

(51) Int. Cl.
B23K 26/38    (2014.01)
B23K 26/062   (2014.01)
(Continued)

(52) U.S. Cl.
CPC ............ *B23K 26/062* (2015.10); *B23K 26/38* (2013.01); *B23K 26/702* (2015.10); *B23K 2101/04* (2018.08); *B23K 2101/18* (2018.08)

(58) Field of Classification Search
CPC .......... B23K 2101/04; B23K 2101/18; B23K 26/38; B23K 26/702; B23K 26/062
(Continued)

(56) References Cited

U.S. PATENT DOCUMENTS

| | | | | |
|---|---|---|---|---|
| 5,889,253 A | * | 3/1999 | Kanaoka | B23K 26/60 219/121.72 |
| 5,925,271 A | * | 7/1999 | Pollack | C21D 1/09 219/121.85 |

(Continued)

FOREIGN PATENT DOCUMENTS

| DE | 102018216873 A1 | 4/2020 |
|---|---|---|
| EP | 2883647 B1 | 5/2019 |

OTHER PUBLICATIONS

International Search Report and Written Opinion, dated Feb. 9, 2022, from PCT/EP2021/078616.

(Continued)

*Primary Examiner* — Jimmy Chou
(74) *Attorney, Agent, or Firm* — Workman Nydegger (57) ABSTRACT

In one aspect, the present invention relates to a computing unit (RE) for executing a conversion algorithm, having an interface (UI) for acquiring a first cutting parameter data set (1SP); and having a processor (P) which is designed to extract a movement profile object (bpo) and which is also designed to execute a conversion algorithm that is stored in a memory of the electronic computing unit (RE) so that it can be loaded and/or executed to calculate and provide the second cutting parameter data set (2SP) to the acquired first cutting parameter data set (1SP), wherein the second cutting (Continued)

parameter data set (2SP) is calculated as a function of the extracted movement profile object (bpo).

16 Claims, 9 Drawing Sheets

(51) Int. Cl.
*B23K 26/70* (2014.01)
*B23K 101/04* (2006.01)
*B23K 101/18* (2006.01)

(58) Field of Classification Search
USPC .................................................. 219/121.85
See application file for complete search history.

(56) References Cited

U.S. PATENT DOCUMENTS

| | | | |
|---|---|---|---|
| 6,345,205 B1* | 2/2002 | Inamasu | B23K 26/38 700/47 |
| 2015/0352667 A1* | 12/2015 | Hemes | B23K 26/144 219/121.61 |
| 2016/0207142 A1* | 7/2016 | Kawamoto | B23K 26/21 |
| 2017/0109874 A1* | 4/2017 | Hallasch | B23K 26/60 |
| 2017/0220927 A1* | 8/2017 | Takigawa | B23K 26/38 |
| 2017/0275197 A1 | 9/2017 | Altman et al. | |
| 2019/0126404 A1* | 5/2019 | Matsumoto | B23K 26/38 |
| 2019/0375051 A1 | 12/2019 | Regaard et al. | |
| 2020/0086427 A1* | 3/2020 | Komatsu | B23K 26/0876 |
| 2020/0101566 A1* | 4/2020 | Markushov | B23K 26/044 |
| 2020/0114467 A1* | 4/2020 | Nogami | B23K 26/0861 |
| 2020/0246920 A1* | 8/2020 | Nakagawa | B23Q 17/10 |
| 2020/0298335 A1* | 9/2020 | Nakamura | B23K 26/1438 |
| 2020/0298337 A1* | 9/2020 | Nakamura | B23K 26/1438 |
| 2023/0201956 A1* | 6/2023 | Schwarz | B23K 26/032 219/121.85 |

OTHER PUBLICATIONS

International Preliminary Report on Patentability, dated Jan. 18, 2023, from PCT/EP2021/078616.

* cited by examiner

METHOD, COMPUTER PROGRAM AND LASER CUTTING SYSTEM FOR SMART CORNER CUTTING

The present invention is in the field of laser cutting technology and relates in particular to a method for calculating cutting parameters for controlling and/or regulating a laser cutting process of a laser cutting machine during the laser cutting of parts to be cut.

A laser system, in particular for cutting metal sheets and/or tubes and with a power of generally 2 kW or more, is a highly complex system and comprises a plurality of physical parts and components that are electronically controlled via appropriate control commands, such as control commands for nozzle distance, focus position, gas pressure for the respective part or workpiece to be cut with specific properties (type of material, thickness, etc.). Such laser systems can be laser cutting machines with low, medium, but also high dynamics. As part of the cutting process, a series of setpoint values must be determined to be able to carry out the cutting process to the desired quality. These setpoint values are transmitted to the control on the laser machine for controlling the corresponding modules and/or actuators. The determination of the correct cutting parameters is of great importance, on the one hand, for the quality and, on the other hand, for the performance and the consumption of resources (e.g. of cutting gas). On the other hand, it is also desirable that the cutting parameters work for laser cutting machines both with high dynamics and with medium or low dynamics. However, the determination of the setpoint values is a complex task, since these are sometimes also a function of the speed and/or acceleration with which the laser head is moved on the trajectory.

In the case of laser machines in use today, it is known to adapt the laser power as a function of the current speed for the cut/end cut and in corners and radii. The cutting quality is not only influenced by the correctly metered laser power, but also—and partly also to a large extent—by other dynamic cutting parameters (for example, such as the focus position), which have so far not been corrected or adapted in a speed-dependent manner, which can sometimes lead to a loss of quality.

Cutting parameters can be divided into two categories, which are the static and dynamic cutting parameters. Static cutting parameters cannot be changed during cutting: magnification, nozzle type, nozzle diameter, etc. Dynamic cutting parameters can be changed during the cut, while maintaining the dynamic limits. The dynamic cutting parameters include: focus position, gas pressure, laser power, pulse width, pulse frequency and nozzle distance, and of course the feed rate (maximum cutting speed) and the setpoint speed (as a function of the machine/axis dynamics). The feed rate defines the maximum cutting speed, which can be achieved with straight cutting, if necessary. The setpoint speed is calculated as the target speed as a function of the geometry (e.g. curvature). A cut usually starts at speed "v=0" and is accelerated from zero to the feed rate, if possible—as a function of the curvature/radii. In other words, the setpoint speed falls below the feed rate, for example in the case of radii.

As explained above, the quality, in particular the burr height, of the cut part is largely determined by the cutting parameters used. It is known from experience that higher quality can be achieved if the dynamic cutting parameters for straight cuts are selected differently than for cuts in corners/radii. The architecture of the machine that has been used to this day hardly allowed any adaptation of the dynamic cutting parameters (focus position, gas pressure, etc.). Therefore, the cutting parameters used today are a compromise setting between the two optima of straight cut and corners/radii. This results in the following disadvantages:

1) With straight cuts, higher feed rates could be achieved if the other dynamic cutting parameters for corners and radii could be adjusted in a speed-dependent manner.
2) The quality is unsatisfactory either in the straight cut and/or in the case of corners/radii.
3) The cutting gas volume is increased over the entire contour to combat unsatisfactory corners/radii. This leads to a higher consumption of cutting gas.

In the prior art, for example in EP2883647 B1, methods are known to improve the setting of the cutting parameters and in particular to adapt or readjust a first cutting parameter when a second cutting parameter is changed. However, this method can be further improved. It is particularly desirable if the geometry of the part to be cut can be taken into account in a dynamic manner when determining the cutting parameters.

Furthermore, DE102018216873A1 shows a method and a device for processing a workpiece with a laser cutting machine. Material parameters, in particular a material thickness and machine parameters concerning the type of laser cutting machine and, in particular, a desired cutting edge quality are specified to the control system via an input unit. From these, the computer unit uses an algorithm to determine improved, preferably optimal, process parameters for processing the workpiece.

US 2019/0375051 A1 discloses monitoring or controlling a cutting process on a workpiece. A focusing element focuses a high-energy beam on the workpiece. A camera records an interaction area of the high-energy beam with the workpiece. A control unit determines at least one characteristic variable of the cutting process, in particular of a cutting gap formed during the cutting process, on the basis of the detected interaction area.

US 2017/0275197 A1 discloses a laser cutting method for glass materials and the optimization or regulation of laser parameters to achieve the highest possible quality of the cutting edge.

To improve the quality, the effectiveness (performance) and the resource requirements (e.g. cutting gas consumption) of the laser cutting process in the application region of cutting metal sheets and tubes, there is a need for a solution to adapt a number of cutting parameters, in particular the dynamic cutting parameters, to the different speeds and/or accelerations with which sections of a cutting contour are traversed and to be able to adapt to the different contour courses (curvatures). If, for example, the process feed rate must be reduced because the path cannot be traversed quickly enough at points with a high degree of curvature or in corners, the dynamic cutting parameters should automatically adapt accordingly.

The present invention has therefore set itself the object of improving the quality of the laser cutting process while ensuring the highest possible productivity. In addition, the need for cutting gas is to be reduced. In particular, the corners or sections with small radii should be processed with dynamic process values other than, for example, straight cuts, in addition to the laser power.

In a first aspect, the invention relates to a (computer-implemented) method for calculating a second cutting parameter data set for controlling and/or regulating a laser cutting process of a laser cutting machine during the laser cutting of (structural) parts or workpieces, in particular plate-shaped metal sheets, from which—according to the cutting plan—the parts are cut out with the following method steps, which are carried out on an electronic computing unit:

acquisition of a first cutting parameter data set;

extraction of a motion profile object;

execution of a conversion algorithm, which is stored loadable and/or executable in a memory of the electronic computing unit, to calculate and provide the second cutting parameter data set from the acquired first cutting parameter data set, wherein the second cutting parameter data set is calculated as a function of the extracted movement profile object. The calculated second cutting parameter data set can preferably be brought directly to the laser cutting machine, for example to change the focus position in a speed-dependent manner.

Generally, the method is carried out during laser cutting. The required input data for the algorithm can be read in from the cutting plan, for example. The machine control specifies a first cutting parameter data set that is to be used to control the machine (laser). This can be changed, depending on the application, by means of the method described here, so that the machine is no longer controlled with the first cutting parameter data set, as originally intended, but with the calculated second cutting parameter data set. In a preferred embodiment of the invention, the method is one that calculates the second cutting parameter data set, which is then used to control the machine. A feedback of measured values or sensor data (such as from a camera) that occur during cutting is optional, but not absolutely necessary. The cutting parameters (focus position, gas pressure . . . ) are dynamically adapted based on the current cutting speed and/or acceleration and/or curvature; a function catalogue can be used for this. In a simpler alternative variant of the invention, the method can also be carried out before the laser cutting.

Laser cutting relates in particular to the cutting of metal sheets or tubes with a laser having a power of 2 kW or more.

The term "movement profile object" should be understood as an electronic object, e.g. as a file or storage element (for storage, for example, in a database) in which data relating to the movement to be performed by a laser cutting head and/or data relating to the geometry to be cut, in particular data on the curvature and/or radii of the contour to be cut are stored. The movement profile object can be read in from a control (e.g. CNC). The movement profile object indicates in particular curvature data and/or data on any radii that are to be cut, which can be extracted from the cutting plan, for example. The data stored or used in the movement profile object can be part of the first cutting parameter data set and/or can be calculated therefrom. Alternatively or cumulatively, the data stored in the movement profile object can be calculated from a cutting plan. The movement profile object can comprise absolute information on the movement and/or geometry or corresponding progress information over time (for example as a movement profile). The movement profile object can be generated with a cycle rate or update rate ranging from 0.01 ms to 10 ms, preferably 0.05 ms to 5 ms, ideally 0.5 ms to 1.5 ms.

In a simple embodiment, the movement profile object can thus also represent only an absolute value of a movement variable, such as an acceleration value (as a setpoint value or setting value, and thus in absolute form), a speed value, a curvature value that indicates the curvature of the geometry/trajectory.

The curvature can be calculated from the cutting plan and/or specified by a control. The curvature is given by the parametric derivatives of the curve/geometry:

$$\kappa = \frac{|\underline{r}' \times \underline{r}''|}{|\underline{r}'|^3},$$

where "r" is the radius and "r'" is the first parametric and "r''" is the second parametric derivative of the curve.

The technical advantage that arises from the calculation using the conversion algorithm based on the movement profile object is that selectable dynamic cutting parameters are calculated on the basis of selectable movement or geometry data. In a configuration phase, the user thus has the option to make their specifications for the respective application. In a first case, the focus position can be adapted as a function of the cutting speed and in a second case, the gas pressure or another dynamic cutting parameter can be adapted as a function of the acceleration. This can improve the flexibility of the adaptation method.

In a further embodiment of the invention, the movement profile object comprises a course of the speed, acceleration and/or jerk and/or curvature over time. In principle, the conversion algorithm is not only limited to speed-dependent changes in the setpoint values, but can also be made dependent upon acceleration values, the curvature of the cutting path, and/or other variables.

The first and second cutting parameter data sets are characterised by a set of pre-configurable dynamic cutting parameters. This has the technical advantage that not only can the laser power be adapted to the speed, but also other dynamic cutting parameters to be able to provide better quality even with different contour requirements. Preferably, a plurality of cutting parameters can be corrected or adapted (hence the term cutting parameter data record to make it clear that we are dealing with a set of different parameters and not just one (as before: laser power)). In an advantageous embodiment of the invention, the first and/or second cutting parameter data set can therefore comprise a set of dynamic cutting parameters, namely in particular focus position, pulse pattern (pulse width, pulse frequency), nozzle distance, gas pressure, laser power, beam parameter product/BPP and/or focus diameter. Of course, the cutting speed is also one of the dynamic cutting parameters, which, depending on the geometry to be cut, has already been determined by a control system adapted to the geometry, so that straight cuts are made faster and, for example, finely granular contours, such as small angles and radii, are made slower. According to the invention, the other cutting parameters mentioned above are also automatically adapted in these regions.

The computing unit is an electronic module for data processing. The electronic computing unit can be designed as a monolithic unit for executing the acquisition of the first cutting parameter data set, for extracting the movement profile object, and for executing the conversion algorithm. Alternatively, the computing unit can also be designed to be distributed among different computer-based entities. This has the advantage that a first part of the above-mentioned steps can be carried out on a first unit and a second part on a second unit and thus the method can be made more modular. In particular, a first control (e.g. CNC kernel) can be implemented in which functions freely available to the customer (e.g. for calculating the first cutting parameter data set, preferably for calculating the drive speed of the axis drives for moving the laser cutting head) are executed and a second control (e.g. PLC, programmable logic control unit), in which, for example, the conversion algorithm is carried out with access to the functions of the function catalogue, which are primarily to be kept proprietary, as these are associated with relatively high development costs. Advantageously, the functions of the function catalogue could also be further developed after delivery of the product and subjected to an update process. In this embodiment, process logic components are carried out in the second controller, e.g. PLC, by means of the conversion algorithm with access to the function catalogue, such as the calculation of the adjusted gas pressure and/or the focus position as a function of the speed, acceleration and/or curvature. Alternatively or cumulatively, both controls can be kept in one unit. Alternatively or cumulatively, second separated, separate memories can be formed. The software components for calculating the first setpoint value data set are stored in the first memory, and the software components for calculating the correction values (second setpoint value data set) can be stored in the second memory. The functions of the function catalogue and/or the parameters for parametrising the functions can be stored in the second memory. The optimised cutting parameters, i.e. the parameters of the second cutting parameter data set, can also be calculated offline. The result of this calculation (for example on an external entity) can be represented in a so-called M command and, for example, written into the NC code to then execute or process it on the laser machine. This means that the speed is calculated again by the CNC control, and the optimal cutting parameters, which are stored as M commands in the NC code, are transferred to the PLC control. In this embodiment, two different controls are thus formed, which can be formed on different entities (local and external to the laser machine) and are entrusted with different control and calculation tasks. This means that the expertise for the calculations can be distributed very variably to the entities involved.

The conversion algorithm is a computer-implemented method that converts a first set of cutting parameters, which can be read in by a controller (e.g. CNC), for example, into the second set of cutting parameters, taking into account geometry data (curvature, radii) of the geometry to be traversed. For this purpose, transformation rules are used that are based on a function catalogue that can be stored in an external or internal memory. The former has the advantage that the function catalogue can still be changed, in particular parametrised, even while the method is being carried out. In this way, certain constants can be set in the formulas, which are then used for conversion. The conversion algorithm takes into account the data of the movement profile object when calculating the result in the form of the second cutting parameter data set. The geometry data (in particular curvature, radii) are stored in the motion profile object.

The catalogue of functions can make the following conversions from the first cutting parameter set to the second cutting parameter set or a subset thereof:

$$X = \begin{bmatrix} v_c, F, A, \kappa, D, z_0, p_H, P_L, z_N, P_W, P_F, BPP, \\ \Delta_{z_0}^{v_c}, \Delta_{p_H}^{v_c}, \Delta_{P_L}^{v_c}, \Delta_{P_W}^{v_c}, \Delta_{P_F}^{v_c}, \Delta_{z_0}^{A}, \Delta_{p_H}^{A}, \\ \Delta_{P_L}^{A}, \Delta_{P_W}^{A}, \Delta_{P_F}^{A}, \Delta_{z_0}^{\kappa}, \Delta_{p_H}^{\kappa}, \Delta_{P_L}^{\kappa}, \Delta_{P_W}^{\kappa}, \Delta_{P_F}^{\kappa} \end{bmatrix}$$

where:
$v_c$: Commanded speed
F: Feed rate
A: Acceleration
$\kappa$: Curvature of the contour to be cut
D: Material thickness
$z_0$: Focus position
$p_H$: Gas pressure
$P_L$: Laser power
$z_N$: Nozzle distance
$P_W$: Pulse width of laser
$P_F$: Pulse frequency of laser
BPP: Beam parameter product.

The conversion algorithm is based on two characteristics of the speed: the feed rate and the setpoint speed.

The conversion algorithm is preferably executed during cutting and is used to dynamically adjust the originally intended cutting parameters. This adjustment is then transmitted as a calculated second cutting parameter (data) set to the machine's controller for control purposes.

In general, the function catalogue can be described as follows:

$$u^* = f(x)$$

where u* is a vector which represents the optimized cutting parameters. The vector consists of the locally adapted focus position, gas pressure, laser power, pulse width, pulse frequency and the nozzle distance. In practice, usually only the focus position is adjusted. The optimized cutting parameters are calculated based on the function $f(\ )$ and their inputs x. This means that the optimized cutting parameters are locally dependent on various inputs such as the feed rate, the cutting speed, and the sheet metal thickness. For each cutting parameter there is a separate function which has been specified as $f(x)$ for the purpose of simplifying the wording. $f(x)$ is a vector made up of the individual functions:

$$f(x) = [f^{z_0}(x), f^{p_H}(x), f^{p_{P_L}}(x), f^{P_W}(x), f^{P_F}(x), f^{z_N}(x)]$$

In each cycle (millisecond cycle) the function $f(x)$ is called to obtain the optimized cutting parameters u*.

The feed rate describes the maximum achievable speed with which the laser cutting head can be moved. The feed rate is primarily material-dependent (in particular the thickness and/or the type of material to be cut) and also depends on the built-in motors and drives and mechanical components of the laser system. The feed rate is usually entered by the user via a field on a user interface or is automatically calculated algorithmically (e.g. model-based). The feed rate can also be specified by a control unit.

In contrast to the feed rate, the setpoint speed is geometry-dependent. The setpoint speed can be calculated, for example, by a CNC control. By definition, the setpoint speed is less than or equal to the feed rate. The setpoint speed value will fall below the feed rate value, especially in the case of curvatures or angles. If the value falls below this, and in the latter case, the dynamic setpoint values of the first setpoint value data set should be corrected. However, the invention is not limited to a speed-dependent setpoint value correction, because this can also be corrected as a function of the acceleration, the jerk and/or the trajectory/geometry.

The output of the respective function for calculating the second cutting parameter data set is:

$$u^* = [z_0^*, p_H^*, P_L^*, P_F^*, z_N^*]$$

where:
the variables marked with* are the movement profile object-adapted focus position, laser power, gas pressure, pulse width, pulse frequency, and nozzle distance. Thus, according to the invention, cutting parameters that are optimised with regard to the corner quality and the cutting geometry can be calculated:

$z_0^*$: optimised focus position
$p_H^*$: optimised gas pressure
$P_L^*$: optimised laser power
$P_W^*$: optimised pulse width working laser
$P_F^*$: optimised pulse frequency working laser
$z_N^*$: optimised nozzle distance.

For each output there is a separate function, which is dependent on the inputs x $z_0^* = f^{z_0}(x)$: optimised focus position
$p_H^* = f^{p_H}(x)$: optimised gas pressure
$P_L^* = f^{p P_L}(x)$: optimised laser power
$P_W^* = f^{P_W}(x)$: optimised pulse width working laser
$P_F^* = f^{P_F}(x)$: optimised pulse frequency working laser
$z_N^* = f^{z_N}(x)$: optimised nozzle distance.

The functions can be linear or trigonometric. For example, this results in the speed-dependent focus position with a sine function as the base and exponent $\varepsilon_{z_0}=2$:

$$f^{z_0}(x) = \Delta_{z_0}^{v_c} \sin\left(\frac{F-v_c}{F} 2\pi\right)^2 (v_c \leq F) \rightarrow z_0^* = z_0 + f^{z_0}(x).$$

For example, for focus positions that are linearly dependent on the acceleration result:

$$f^{z_0}(x) = \Delta_{z_0}^A ((A_{max} - A_{min}) - \|A\|)(0 \leq \|A\|)(\|A\| \leq A_{max}) \\ (A_{min} \leq \|A\|) + \Delta_{z_0}^A (A_{max} \leq \|A\|)(A_{min} \leq \|A\|) \rightarrow z_0^* = z_0 + f^{z_0}(x),$$

where $A_{max}$: acceleration up to which the changes should be applied. Higher accelerations do not lead to any additional change. $A_{min}$: acceleration from which the changes should be applied. Lower accelerations do not lead to any additional change.

The adaptation or correction of the dynamic setpoint values, here for example the focus position, can also take place as a function of the acceleration. For example, for the acceleration-dependent focus position with a sine function as the base and exponent $\varepsilon_{z_0}=4$:

$$f^{z_0}(x) = \Delta_{z_0}^A \left(1 - \frac{\sin(A_{max} - \|A\|)^4}{(A_{max} - A_{min})} \frac{\pi}{2}\right)(0 \leq \|A\|)(\|A\| \leq A_{max})(A_{min} \leq \|A\|) + \\ \Delta_{z_0}^A (A_{max} \leq \|A\|)(A_{min} \leq \|A\|) \rightarrow z_0^* = z_0 + f^{z_0}(x).$$

With the method presented here, significant advantages can be achieved. In this way, the quality of the cut parts can be increased, in particular taking into account the current process conditions (machine/geometry).

In a preferred embodiment of the invention, the method further comprises:
acquisition of a material property of the component to be cut, in particular a sheet metal thickness and/or a material type;
wherein the conversion algorithm for calculating the second cutting parameter data set takes into account the acquired material property, in particular the sheet metal thickness and/or the material type.

The material type identifies the material type, such as structural steel, aluminium, etc. The sheet metal thickness has an influence on the maximum change in the cutting parameters. For example, the maximum change in focus position for steel at speed v=0 is defined by sheet metal thickness D:

$$\Delta_{z_0}^{v_c} = 0.75 * D.$$

If 3 mm steel is cut, the maximum change (at speed 0) is 2.25 mm. Likewise, in a configuration phase, other relationships with, for example, another constant can be defined; therefore the formula can be:

$$\Delta_{z_0}^{v_c} = \alpha_{z_0} * D.$$

Then the maximum change in the cutting parameters (in the above formula, e.g. as $\Delta_{z_0}^{v_c}$) is a factor of the sheet metal thickness D and an additional adjustable parameter or prefactor $\alpha_{z_0}$. Depending on the type and quality of the material, this prefactor $\alpha_{z_0}$ can be chosen differently. The relationship between the maximum change in cutting parameters and the sheet metal thickness D can, however, also be non-linear, so that, for example, the following formula can be used:

$$\Delta_{z_0}^{v_c} = \alpha_{z_0} * D^2.$$

The laser power is typically in a range between 0 and approx. 30 kWatt. The gas pressure is in a range between 1 and 25 bar during fusion cutting and around 0.5 bar during flame cutting. The focus position can be in a range of $-100$ and $+100$ mm and the focus diameter is usually in a range between 100 and 600 micrometres. The BPP can be in a range between 1 to 5 mm*mrad and the nozzle distance can be 0.1 mm to several millimetres, for example. The correction values for the first cutting parameter data set are selected in such a way that the second cutting parameter data set (with the adapted or corrected cutting parameters) still lies within these aforementioned, preconfigurable target ranges.

In a further preferred embodiment of the invention, the movement profile object can indicate a value for a speed, an acceleration and/or a jerk for a point on a cutting geometry and/or a value for a curvature at a position of the cutting geometry or a course of the aforementioned variables overtime, e.g. as a speed profile, acceleration, or jerk profile overtime.

According to a further advantageous implementation of the invention, the conversion algorithm can calculate a dedicated function for each of the dynamic cutting parameters from a set of functions stored in a memory.

In another advantageous embodiment, the set of functions (of the function catalogue) can be parametrisable. This means that the method can be continuously adapted to new developments and continuously improved by simply parametrising a function.

In another advantageous embodiment, the provided second cutting parameter data set can be transmitted directly to a controller on the laser cutting machine for controlling and/or regulating the laser cutting process. This increases the degree of automation.

In another advantageous embodiment it is provided and can be set in a configuration phase that the conversion algorithm is only executed when preconfigurable change conditions are met. The change conditions can be defined, for example, by specifying limit values for selected values of the movement profile object (e.g. if the setpoint speed drops by the value x below the feed rate value or if the acceleration reaches a value y or if the curvature exceeds a value z, etc.). The adaptability of the method can thus be improved.

In another advantageous embodiment, linear or trigonometric functions can be implemented in the conversion algorithm. The function can be specified in the most general form as $f(x)=u*$. In a further advantageous embodiment, the conversion algorithm can calculate the second cutting parameter data set dynamically for each point or for sections of a trajectory (to be followed). This means that the quality can be ensured even with different movement patterns.

In a further advantageous embodiment, an acceleration and/or jerk profile can be calculated, which serves as an input variable for the conversion algorithm. The second setpoint value data set calculated by the conversion algorithm is location- and time-dependent in relation to the trajectory. The second setpoint value data set is thus generated dynamically for each position and each time point of the trajectory.

The achievement of the object has been described above using the method. Features, advantages, or alternative embodiments mentioned in this way should also be transferred to the other claimed objects and vice versa. In other words, the claims in question (which are directed, for example, to a laser cutting system or to a computing unit) can also be further developed with the features described and/or claimed in connection with the method. The corresponding functional features of the method are thereby formed by corresponding subject modules, in particular by hardware modules or microprocessor modules, of the system or of a computer product, and vice versa.

According to a further aspect, the invention relates to an electronic computing unit for executing a conversion algorithm, having:
- an interface for acquiring a first cutting parameter data set (for example, a user interface);
- a processor that is designed to extract a movement profile object and that is furthermore designed to execute a conversion algorithm, which is stored loadable and/or executable in a memory of the electronic computing unit to calculate and provide the second cutting parameter data set from the acquired first cutting parameter data set, wherein the second cutting parameter data set is calculated as a function of the extracted movement profile object.

The electronic computing unit can additionally comprise an interface for reading in the cutting plan, from which, for example, the first cutting parameter data set can be calculated, which is then validated or corrected by means of the conversion algorithm.

According to a further aspect, the invention relates to a laser cutting system having:
- an electronic computing unit, as described above, which can be implemented on a controller and
- a laser cutting machine that is controlled and/or regulated by the controller.

The method for calculating corrections to the setpoint values for operating a laser cutting process is preferably computer-implemented. All or selected method steps can be carried out by one or more computer program(s) on one or more computer unit(s) with a processor (CPU, GPU, etc.). The method can comprise measuring sensor data (e.g. currently measured feed rate) by means of suitable sensors of different types (optical, acoustic and/or other types of sensors). Depending on the type of measured signals, an A/D converter can be used to convert the analogue signals into digital signals. The measurement of sensor data can thus also comprise reading in digital signals.

Another solution to the object provides a computer program, with computer program code for performing all the method steps of the method described in more detail above when the computer program is executed on a computer. It is also possible that the computer program is stored on a computer-readable medium.

DESCRIPTION OF ADVANTAGEOUS EMBODIMENTS IN CONNECTION WITH THE FIGURES

The invention relates to a computer-implemented method for correcting cutting parameters for a laser machine L, which is typically operated with a power of over 2 kW. It can be used in particular for cutting metal sheets and pipes.

The method according to the invention implements an intelligent conversion algorithm for correcting or adapting cutting parameters to increase quality, especially when cutting small radii and corners, in which the setpoint speed of the laser cutting head must be reduced so that sufficient cutting quality can be guaranteed.

Figure 8A:
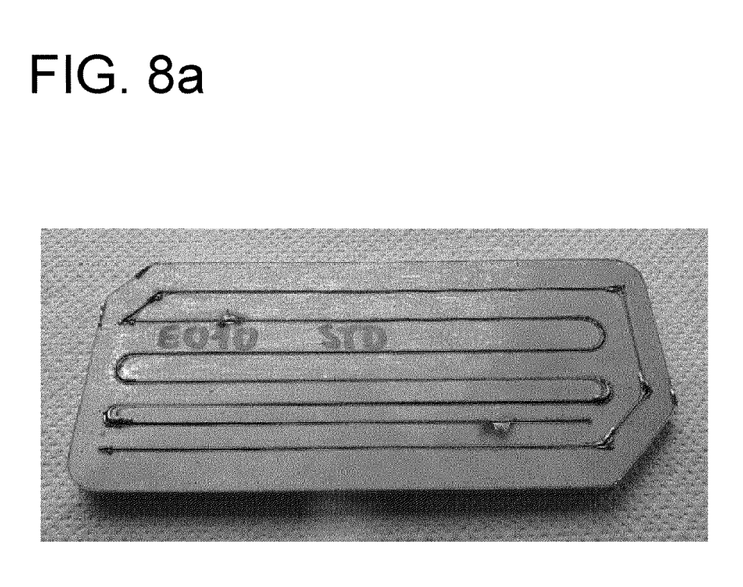
FIG. 8a shows a cutting result without correction of the cutting parameters according to the prior art and FIG. 8b shows a cutting result with a correction of the cutting parameters according to the invention by using the calculation method and FIG. 9 shows an example of a graphic representation of the speed-dependent change in the focus position.
Figure 8B:
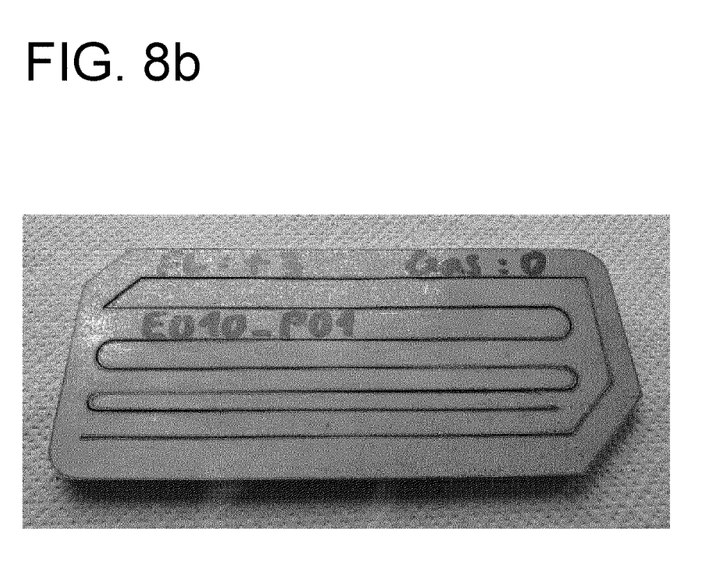

The advantageous technical effect of the method according to the invention was tested in test series by the applicant. A workpiece WS is shown in FIG. 8A that has been cut with non-adapted or corrected cutting parameters, in particular a first cutting parameter data set 1SP. As can be seen in FIG. 8A, the cut has melting regions in the corners and radii as well as in the incision. In contrast thereto, the method according to the invention was used in FIG. 8B and the cutting parameters were corrected; the workpiece WS was cut with the second cutting parameter data set 2SP calculated by means of a conversion algorithm. As can be seen, the quality is also good in the corners and radii as well as in the first and last cut. According to the invention, this quality can be ensured with constant or even improved performance (time for cutting the parts).

Figure 1:
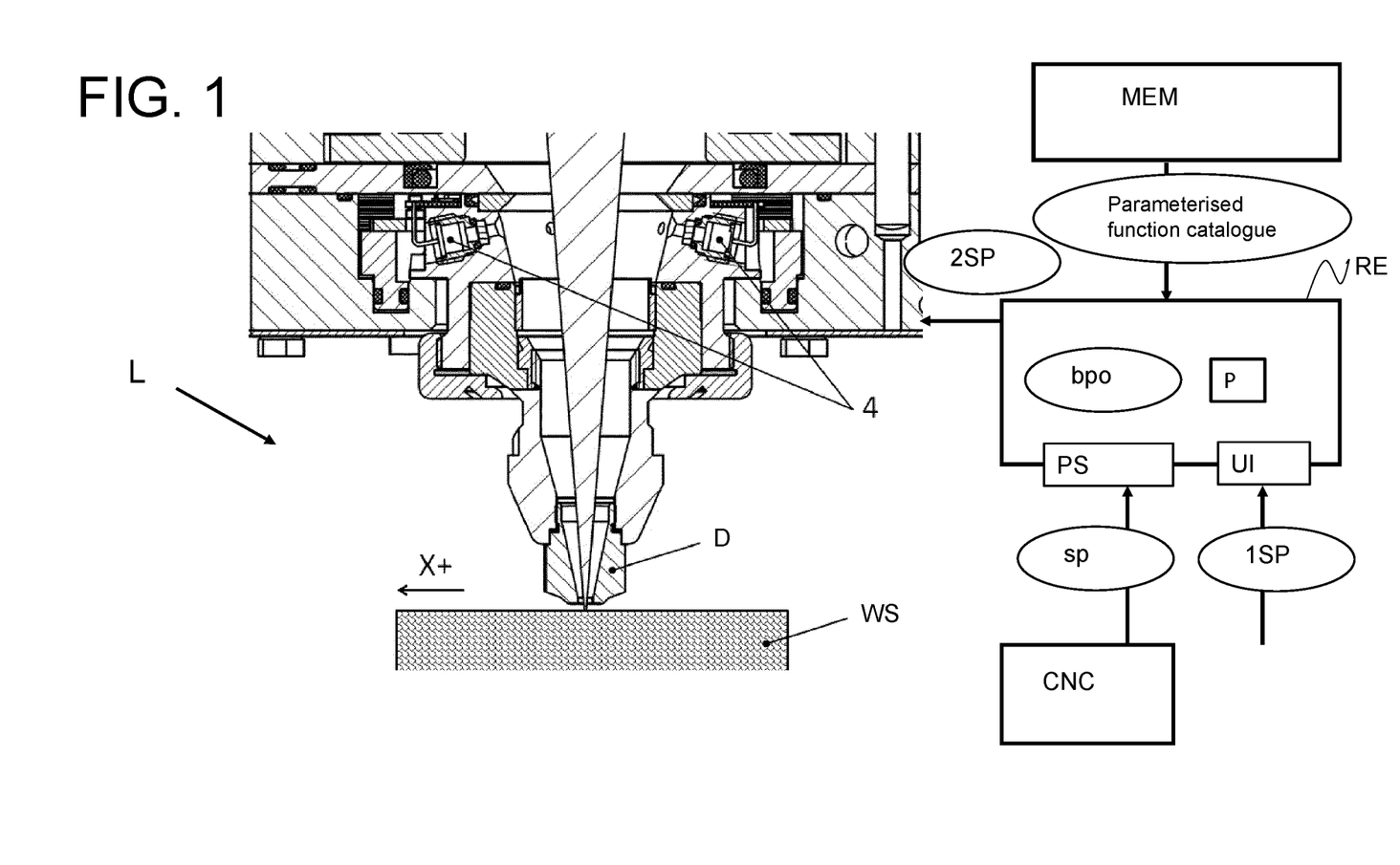
FIG. 1 shows a schematic overview of a laser cutting machine that is controlled by a computing unit.

FIG. 1 shows a laser cutting machine L with a nozzle D that is designed to cut, for example, a plate-shaped sheet metal or a metal tube, also called a workpiece WS. The specific structure of the laser machine L is not significant for the implementation of the present invention. Usually, a plurality of sensors, for example in the form of photodiodes 4, can be integrated into the laser head, for example to take pictures of the cutting gap to be able to assess the quality of the cutting result based thereon. The laser machine L can comprise a controller C (not shown in FIG. 1) that is designed to implement external instructions and—possibly parametrised—instructions and to control or regulate the laser cutting process. In the present case, a computing unit RE can be designed to calculate and provide at least some of the external instructions and to transmit them to the controller C for execution. The computing unit RE is an electronic entity that is provided as a node in a network. It can be part of a cloud-based server, for example. The electronic computing unit RE (hereinafter also referred to as computing unit RE for short) comprises a processor P. As shown in more detail in FIG. 1, the computing unit RE comprises a processor P for executing procedures, functions and in particular a conversion algorithm. The computing unit RE is in data exchange with other entities. In particular, an external memory MEM can be provided, which the computing unit RE accesses to call up parameters for the parameterisation of functions for adapting the cutting parameters as well as the respective functions. The respective—preferably parametrised—functions are then loaded onto the computing unit RE and are available there for execution. Furthermore, the computing unit RE is designed to receive additional data sets. The computing unit RE can thus comprise a user interface UI on which the user can make inputs. For example, a first cutting parameter data set 1SP can be acquired on the user interface UI. Alternatively, the first cutting parameter data set 1DS can also be read out from a memory (for example, a table-like data structure) as a standard parameter data set, for example. The computing unit RE can also be in data exchange with a further control unit CNC to receive, in particular, a cutting plan sp and/or cutting plan-related data. "Cutting plan-related data" are data that are either contained in the cutting plan sp or can be deduced therefrom. The cutting plan-related data include, for example, the feed rate, the acceleration, the curvature ratios of the geometry to be cut, etc.

In a first variant of the invention, the computing unit RE can be designed to extract or calculate a movement profile object bpo from the received data, in particular from the cutting plan sp and possibly standardised, preset cutting parameters. A value for the speed, acceleration and/or jerk (derivation over time) of the drive axes of the laser head for a specific position on the geometry (circumference of the part to be cut) can be stored in the motion profile object bpo. In the movement profile object bpo, a value for a curvature for a point on the cutting geometry can also be stored cumulatively or alternatively. In a variant, a course of the named variables (speed, acceleration, jerk, curvature) over time can also be stored in the movement profile object bpo.

In a second variant of the invention, the movement profile object bpo can already have been extracted on an entity external to the computing unit, for example on the CNC control. In this case, the movement profile object bpo need not be calculated on the computing unit RE, but can already be read in in processed form via an interface and processed directly.

After acquiring the first cutting parameter data set 1SP and the extracted movement profile object bpo, the computing unit RE can convert the first cutting parameter data set 1SP into the second cutting parameter data set 2SP using a conversion algorithm using the functions of the parametrised function catalogue. The second cutting parameter data set 2SP functions as a modified CNC code, so to speak, and is transmitted directly to the internal controller C of the laser cutting machine L for controlling the laser cutting machine L (or the axes/axis drives thereof). Thus, the laser cutting machine L is not—as before—operated with the specifications of the CNC control, but with a modified code that comprises corrected setting values that are encoded in the second cutting parameter data set 2SP.

Figure 2:
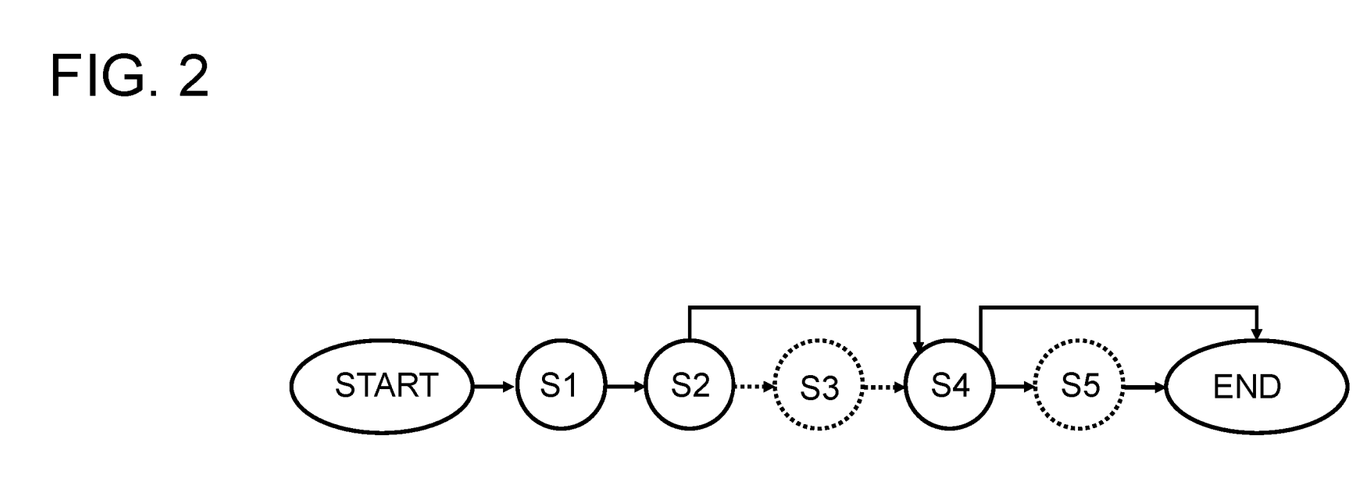
FIG. 2 is a flow chart of a method for calculating the second cutting parameter set in different embodiments.

FIG. 2 shows a sequence of the calculation method according to the invention in different embodiments (represented in the figure by dotted circles).

After the start of the method, the first cutting parameter data set 1SP is acquired in step S1. In step S2, the movement profile object bpo is extracted. In a first variant of the invention, the conversion algorithm can then be carried out in step S4. The method can then be ended. In a second variant of the invention, a material property of the material to be cut can optionally be acquired in step S3. In this method step it can be specified, for example, how thick the material to be cut (for example sheet metal) is and what type of material it is (for example, aluminium or steel, etc.). These aforementioned variables for the material property can then be taken into account by the conversion algorithm for calculating the second cutting parameter data set 2SP. The corrected or adapted cutting parameter data set, namely the second cutting parameter data set 2SP, can thus be matched even better to the respective application.

In principle, the sequence of the method steps acquisition of the first cutting parameter data set S1, extraction S2 and acquisition of the material property S3 is not fixed and can also be varied so that the method steps can be carried out in a different sequence (for example S2, S3, S1) or even in parallel.

In a preferred embodiment, it is provided that the calculated second cutting parameter data set 2SP is transmitted directly and automatically in step S5 to the controller C of the laser cutting machine L for control and/or regulation. However, this step is optional and is therefore shown in dotted lines in FIG. 2. In a variant of the invention, however, it can be provided that the calculated second cutting parameter data set 2SP is fed to a validation process in that it is output on a user interface UI and, during validation, a validation signal is acquired on the user interface UI, which indicates the validation of the corrected cutting parameter data set. In this case, the second cutting parameter data set 2SP is only transmitted to the controller C after the validation signal has been acquired, so that the security of the correction method can be increased.

Figure 3:
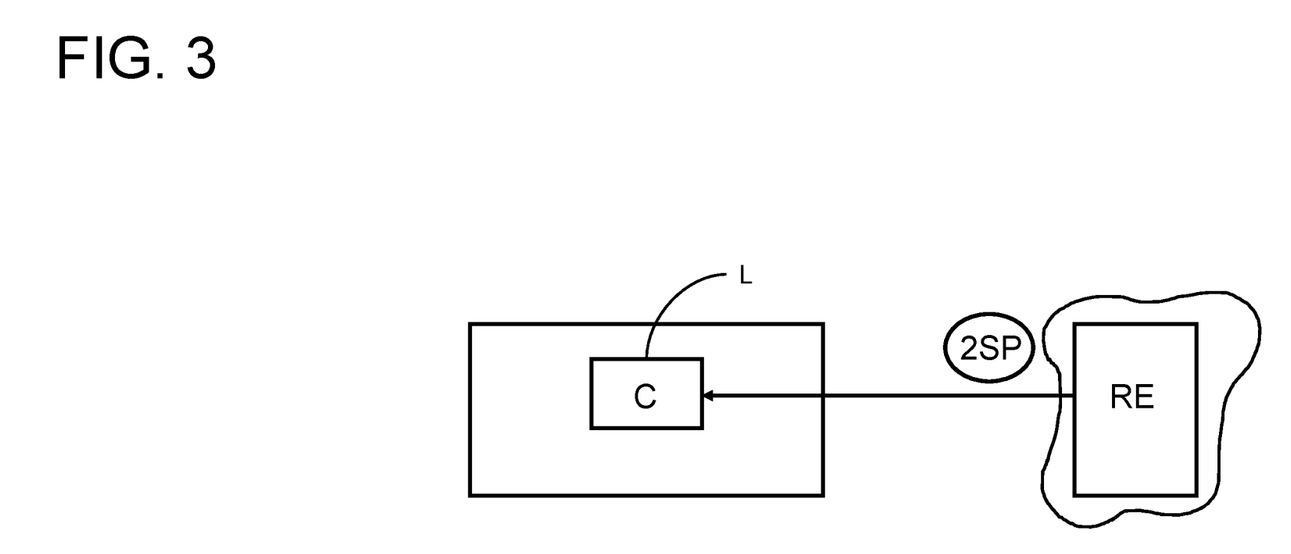
FIG. 3 is a schematic representation of an architecture according to a first preferred embodiment of the invention and FIG. 4 is a schematic representation of an alternative architecture according to a second preferred embodiment of the invention.

A possible structural design of the laser cutting system is shown in FIG. 3. In this variant, the electronic computing unit RE is connected to the laser cutting machine L as an external entity via a data connection. The computing unit RE can be deployed, for example, on a cloud-based server ("cloud" in FIG. 3) which is connected to the laser cutting machine L via an internet connection. In this respect, the embodiment shown in FIG. 3 agrees with that described in more detail in FIG. 1. The electronic computing unit RE serves, as described, to calculate the second cutting parameter data set 2SP, which is transmitted directly to the controller C of the laser cutting machine L via the data connection. In this case, the computing unit RE can be implemented, so to speak, between the CNC control CNC and the controller C internal to the laser machine. Alternatively, it is also possible to implement the computing unit RE on the control CNC.

Figure 4:
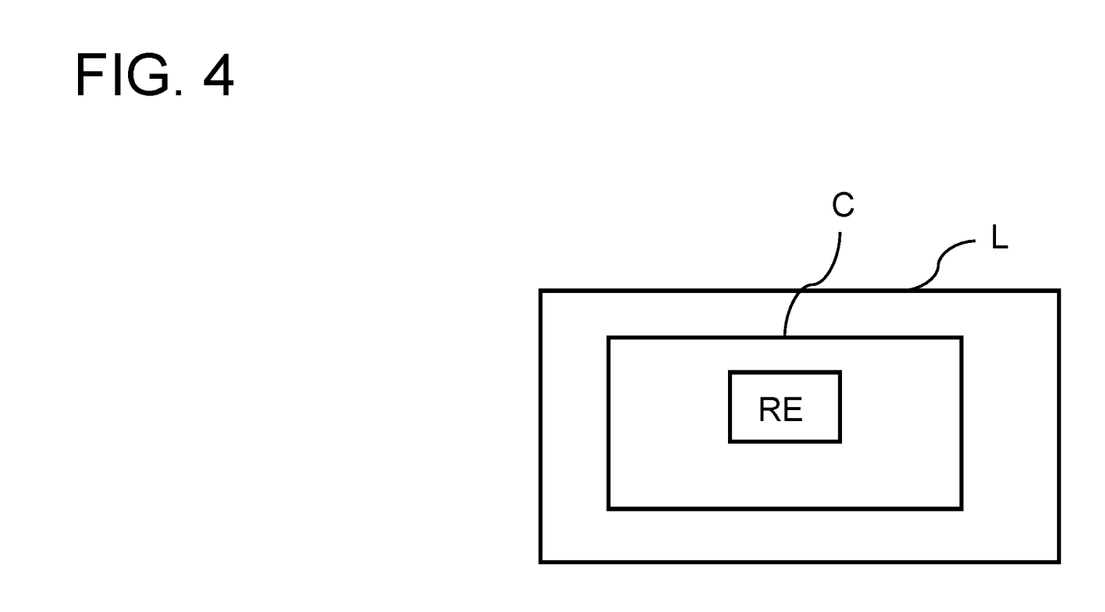

In comparison to FIG. 3, FIG. 4 shows an alternative embodiment. In this case, the computing unit RE is installed directly on the controller C of the laser cutting machine L. The computing unit RE and/or the controller C can optionally be in data exchange with an external control CNC, in particular to receive control data.

As already mentioned above, the conversion algorithm is based on functions of the function catalogue. The functions can be linear or trigonometric. In other embodiments of the invention, other types of functions can be selected. For example, the conversion algorithm can determine the speed-dependent focus position using a sine function as the base and exponent $\varepsilon_{z_0}=2$ as follows:

$$f^{z0}(x) = \Delta_{z_0}^{v_c} \sin\left(\frac{F-v_c}{F}2\pi\right)^2 (v_c \leq F) \to z_0^* = z_0 + f^{z0}(x).$$

Figure 5:
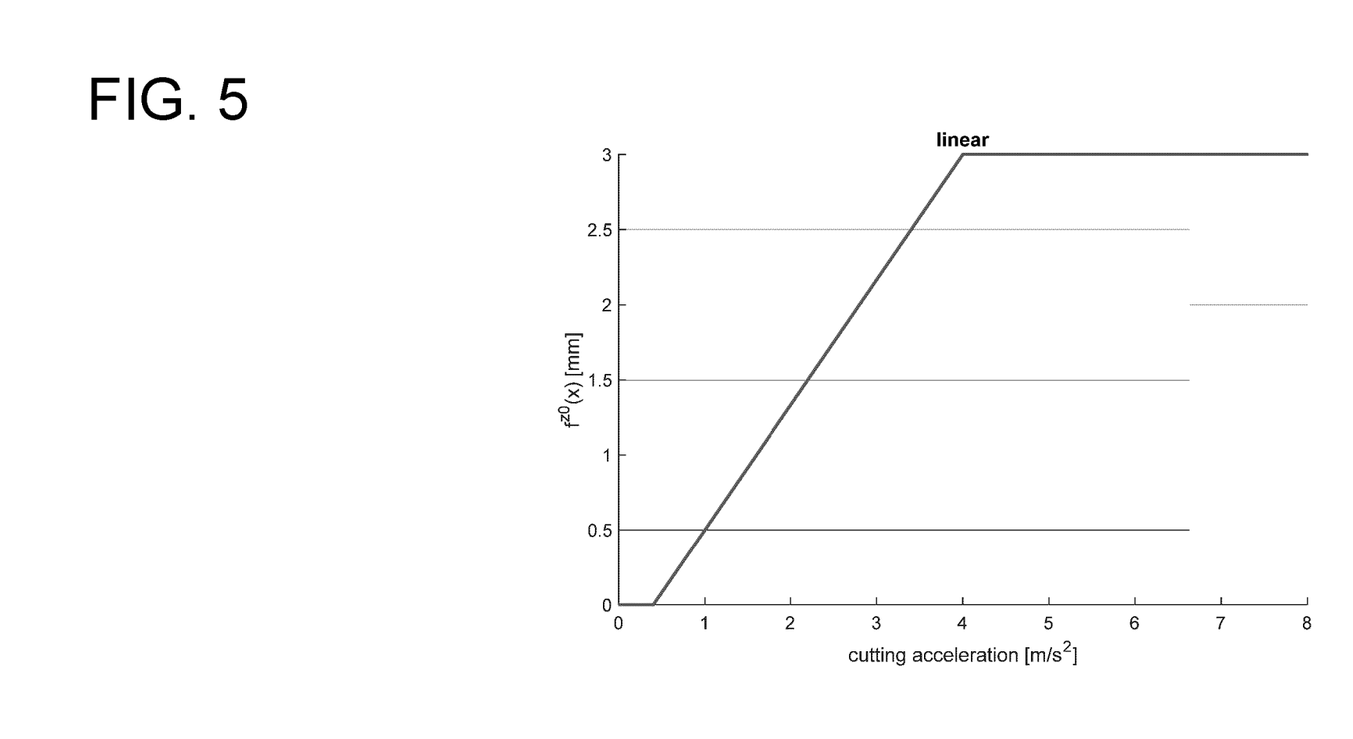
FIG. 5 shows an example of a correction of the focus position that is linearly dependent on the acceleration as a cutting parameter.

For focus positions that are linearly dependent on the acceleration, the conversion algorithm can access the following function of the function catalogue:

$$f^{z0}(x)=\Delta_{z_0}^{A}((A_{max}-A_{min})-\|A\|)(0\leq\|A\|)(\|A\|\leq A_{max})$$
$$(A_{min}\leq\|A\|)+\Delta_{z_0}^{A}(A_{max}\leq\|A\|)(A_{min}\leq\|A\|)\to z_0^*=z_0+f^{z0}(x),$$

where $A_{max}$ the acceleration is up to that at which the changes should be applied. Higher accelerations do not lead to any additional change. $A_{min}$ indicates the acceleration from which the changes are to be applied, as shown in FIG. 5. Lower accelerations do not lead to any additional change. Example with $$A_{max} = 4\frac{m}{s^2} \text{ and } A_{min} = 0.4\frac{m}{s^2}.$$

The linear relationship is shown graphically as an example in FIG. 5, where the acceleration on the abscissa and the adapted focus position on the ordinate $f^{z0}(x)$ is shown.

For the acceleration-dependent correction of the focus position, the conversion algorithm can calculate, for example, using a sine function as the base and exponent $\varepsilon_{z_0}=4$ as follows:

$$f^{z0}(x) = \Delta_{z_0}^{A}\left(1 - \frac{\sin(A_{max}-\|A\|)^4}{(A_{max}-A_{min})}\frac{\pi}{2}\right)(0 \leq \|A\|)(\|A\| \leq A_{max})(A_{min} \leq \|A\|) +$$
$$\Delta_{z_0}^{A}(A_{max} \leq \|A\|)(A_{min} \leq \|A\|) \to z_0^* = z_0 + f^{z0}(x).$$

Figure 6:
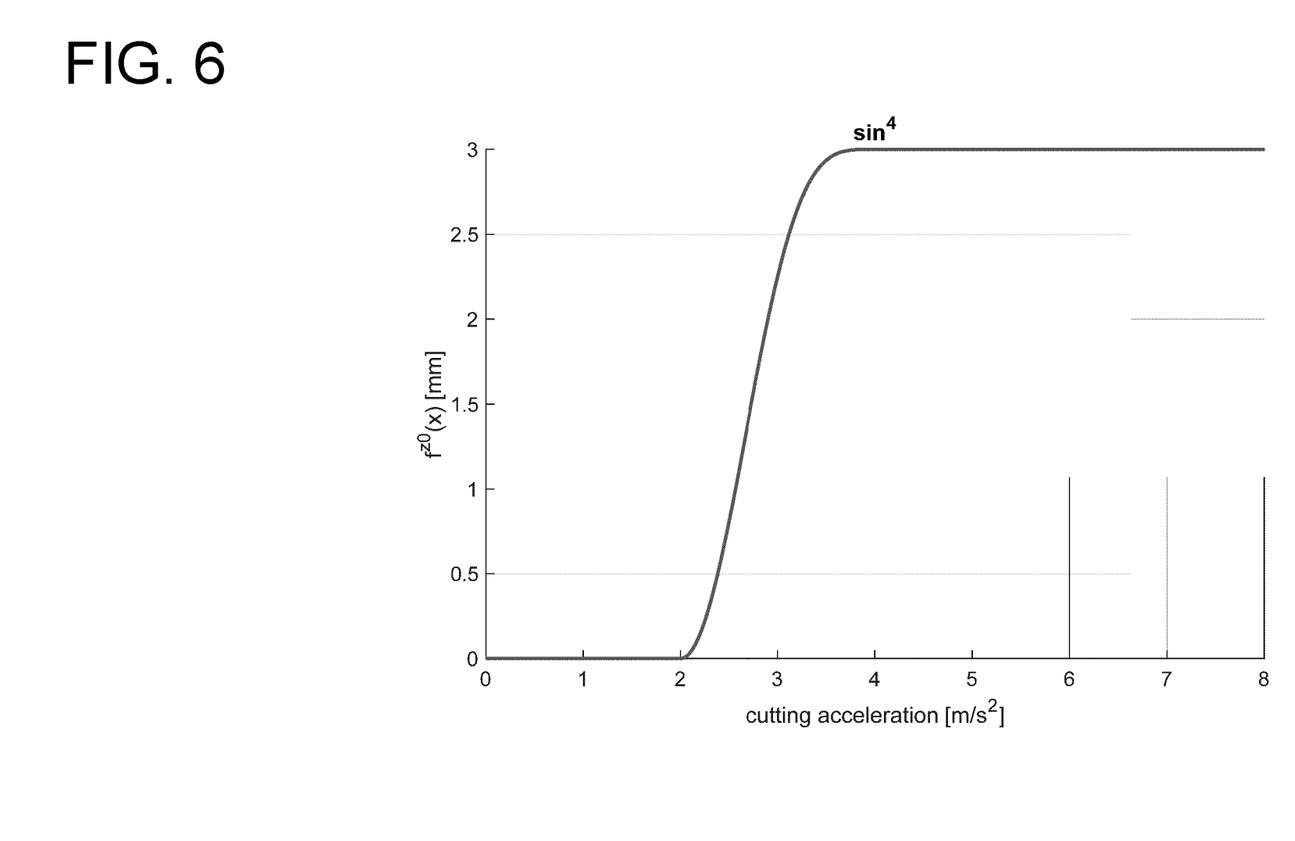
FIG. 6 shows, in another example, an acceleration-dependent correction of the focus position as a cutting parameter with a sine function as the base and exponent

FIG. 6 shows an example of the speed-based adaptation of the focus position $f^{z0}(x)$ with $$A_{max} = 4\frac{m}{s^2} \text{ and } A_{min} = 0.4\frac{m}{s^2}.$$

In this example, "4" was selected as the exponent of the sine function; alternatively, a quadratic sine function can be used.

For the speed-dependent change in gas pressure, the conversion algorithm can calculate, for example, using a sine function as the base and exponent $\varepsilon_{p_H}=3$ as follows:

$$f^{p_H}(x) = \Delta_{p_H}^{v_c}\left(\frac{F-v_c}{F}2\pi\right)^3 (v_c \leq F) \to p_H^* = p_H + f^{p_H}(x).$$

Figure 7:
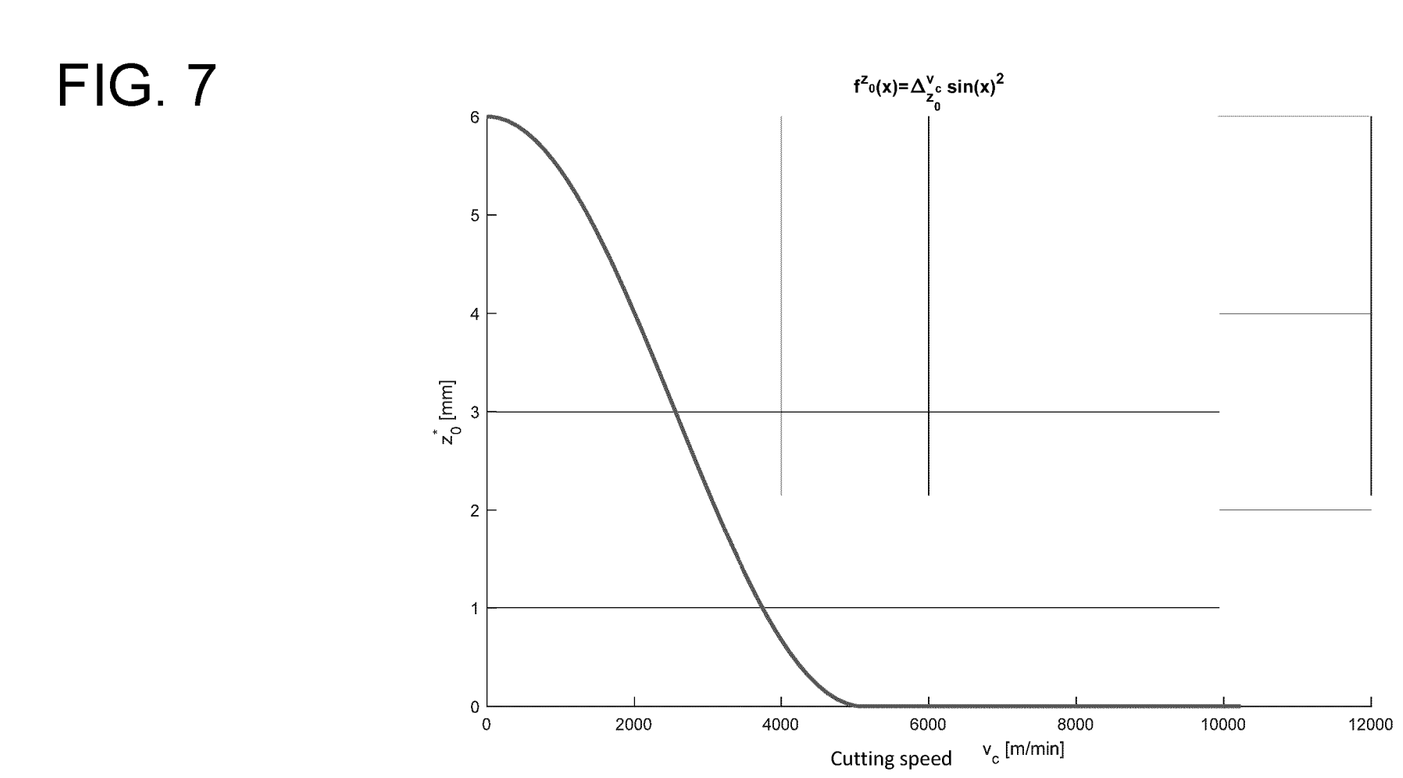
FIG. 7 shows a further example of a speed-based correction of the gas pressure as a cutting parameter.

An example is shown graphically in FIG. 7, wherein the cutting speed on the abscissa $v_c$ and the optimised or adapted focus position plotted on the ordinate as a function of the cutting speed.

Corresponding graphs result when the gas pressure is adjusted as a function of the acceleration or the speed by means of the conversion algorithm.

In further embodiments of the invention, more complex functions and combinations of speed, acceleration and curvature-dependent adjustments can be used:

$$f^{z0}(x) = \Delta_{z_0}^{v_c}\sin\left(\frac{F-v_c}{F}2\pi\right)^2 (v_c \leq F) + \Delta_{z_0}^{\kappa}\sin\left(\frac{F-v_c}{F}2\pi\right)^{12} (\kappa \geq \kappa_{min}),$$

where the radius of curvature can be read from the cutting plan sp. The exponent is given here as an example with "2" and "12". In principle, the exponents of the functions can be set differently depending on the material and depending on the parameter dependency. The exponent can therefore preferably be parametrised.

Figure 9:
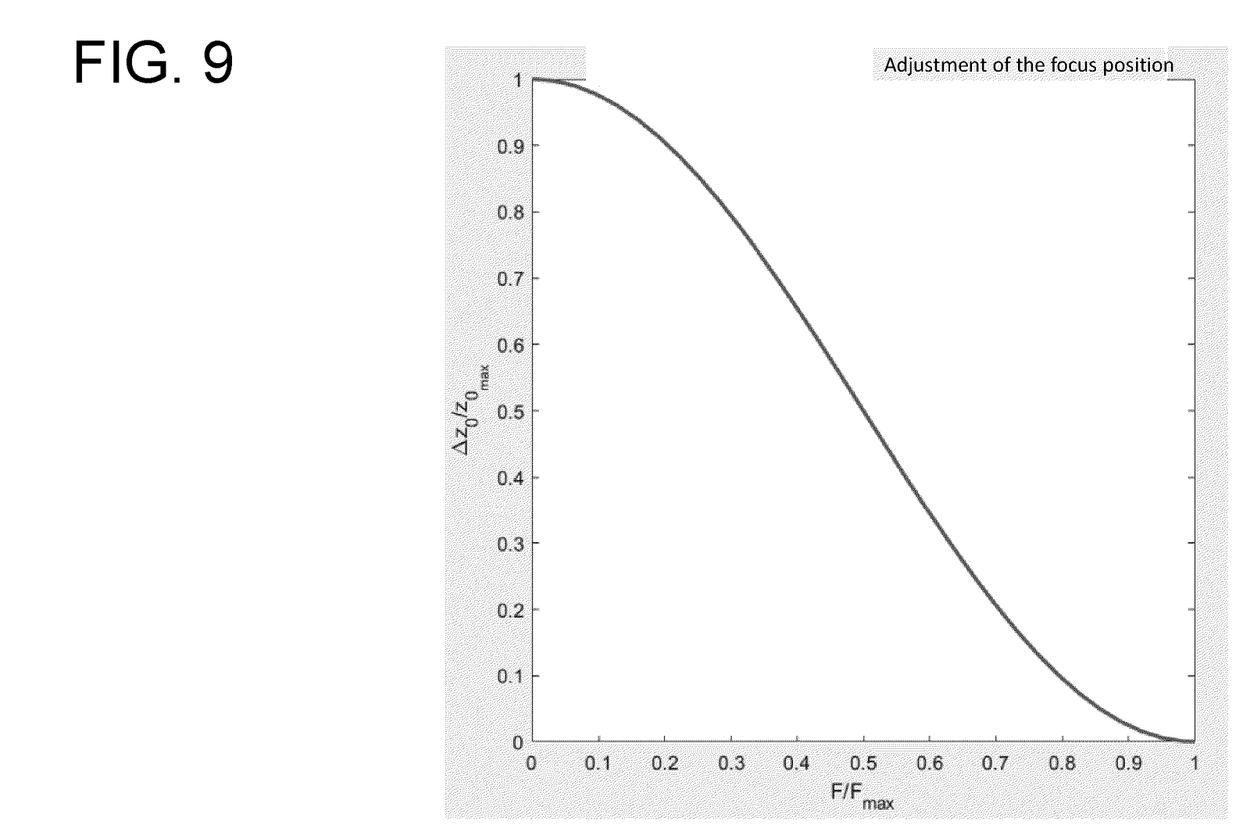

FIG. 9 shows again in which situations an adaptation or correction of the cutting parameters is to be carried out using the example of the focus position (also representing the other dynamic cutting parameters). The conversion algorithm can preferably scale depending on the material and sheet metal thickness. FIG. 9 shows that the focus position is corrected to the maximum when the ratio of the current feed rate to the maximum feed rate is zero or very low, that is, when a trajectory section can be moved much slower than the maximum possible due to the feed rate. If the cutting speed $v_c$ corresponds to the maximum feed rate $v_c=F_{max}$, then the focus position is not adapted, i.e., $\Delta z$ 0/z 0 max is zero.

Finally, it should be noted that the description of the invention and the exemplary embodiments are not to be understood as limiting in terms of a particular physical realisation of the invention. All of the features explained and shown in connection with individual embodiments of the invention can be provided in different combinations in the object according to the invention to simultaneously realise the advantageous effects thereof.

The scope of protection of the present invention is given by the following claims and is not limited by the features illustrated in the description or shown in the figures.

It is particularly obvious to a person skilled in the art that the invention can be used not only for settings of certain process parameters, such as the focus position, but also for other process parameters, for example, such as for adjusting or correcting the gas pressure. Furthermore, the components of the device or computing unit can be produced so as to be distributed over a plurality of physical products.

The invention claimed is:

1. A computer-implemented method for calculating a second cutting parameter data set for controlling and/or regulating a laser cutting process for cutting metal sheets of a laser cutting machine during the laser cutting of components, having the following method steps, which are carried out on an electronic computing unit:

acquisition of a first cutting parameter data set that includes cutting parameters;

extraction of a movement profile object with data relating to a movement to be performed by a laser cutting head and/or data relating to the geometry to be cut, the data relating to the geometry to be cut including data on a curvature and/or radii of a contour to be cut;

execution of a conversion algorithm during cutting to dynamically adjust the cutting parameters, said conversion algorithm is executable in a device memory of the electronic computing unit, to calculate and provide the second cutting parameter data set from the acquired first cutting parameter data set by using a set of functions included in a function catalogue that is stored in a memory, wherein the second cutting parameter data set is calculated using the extracted movement profile object, wherein the cutting parameters include a cutting speed, a focus position, a pulse pattern, a nozzle distance, a gas pressure, a laser power, a beam parameter product/BPP and/or a focus diameter;

wherein said conversion algorithm calculates a function for each of the cutting parameters from the set of functions stored in the memory.

2. The method according to claim 1, wherein the method further comprises:

acquisition of a material property of the component to be cut, the material property including a sheet metal thickness and/or a material type;

wherein the conversion algorithm for calculating the second cutting parameter data set takes into account the acquired material property.

3. The method according to claim 1, wherein the movement profile object indicates a value for a speed, an acceleration and/or a jerk and/or a curvature for a point on a cutting geometry or a course of the aforementioned variables over time.

4. The method according to claim 3, wherein the set of functions is parametrised.

5. The method according to claim 1, wherein the provided second cutting parameter data set is transmitted directly to a controller on the laser cutting machine for controlling and/or regulating the laser cutting process.

6. The method according to claim 1, wherein the conversion algorithm is only executed when preconfigurable change conditions are met, the preconfigurable change conditions including when the movement profile object exceeds or falls below predetermined limit values.

7. The method according to claim 1, wherein the conversion algorithm is implemented as a linear or trigonometric function.

8. The method according to claim 1, wherein the conversion algorithm calculates the second cutting parameter data set dynamically for each point or for sections of a trajectory.

9. The method according to claim 1, wherein an acceleration and/or jerk profile is calculated that serves as an input variable in the conversion algorithm.

10. The method of claim 1, wherein the cutting parameters are dynamic cutting parameters and are dynamically adjusted.

11. The method of claim 1, wherein the memory includes the device memory.

12. The method of claim 1, wherein the memory is an external memory.

13. A computer program having computer program code for performing all method steps of claim 1 method when the computer program is executed on a computer, an electronic entity and/or a computing unit.

14. An electronic computing unit for calculating a second cutting parameter data set for controlling and/or regulating a laser cutting process for cutting metal sheets of a laser cutting machine during the laser cutting of components, the electronic computing unit comprising:

an interface for acquiring a first cutting parameter data set that includes cutting parameters;

a processor that is configured to:

extract a movement profile object with data relating to the movement to be performed by a laser cutting head and/or data relating to the geometry to be cut, the data relating to the geometry to be cut including, data on a curvature and/or radii of a contour to be cut;

execute a conversion algorithm during cutting to dynamically adjust the cutting parameters, wherein the conversion algorithm is executable in a memory of the electronic computing unit to calculate and provide the second cutting parameter data set from the acquired first cutting parameter data set by using a set of functions included in a function catalogue that is stored in a memory, wherein the second cutting parameter data set is calculated using the extracted motion profile object, and execute the conversion algorithm which calculates a function for each of the cutting parameters from the set of functions stored in the memory;

wherein the cutting parameters include a cutting speed, a focus position, a pulse pattern, a nozzle distance, a gas pressure, a laser power, a beam parameter product/BPP and/or a focus diameter.

15. A laser cutting system, having:

an electronic computing unit according to the claim 14 and a laser cutting machine that is controlled and/or regulated by a controller.

16. The laser cutting system according to system claim 14, wherein the electronic computing unit is implemented on the controller.

* * * * *